United States Patent
Ebner et al.

(10) Patent No.: US 10,530,159 B2
(45) Date of Patent: Jan. 7, 2020

(54) PROVISION OF NEGATIVE CONTROL POWER BY A GAS TURBINE

(71) Applicant: Siemens Aktiengesellschaft, Munich (DE)

(72) Inventors: Günther Ebner, Gerhardshofen (DE); Uwe Lenk, Zwickau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 829 days.

(21) Appl. No.: 14/784,751

(22) PCT Filed: Feb. 27, 2014

(86) PCT No.: PCT/EP2014/053828
§ 371 (c)(1),
(2) Date: Oct. 15, 2015

(87) PCT Pub. No.: WO2014/170058
PCT Pub. Date: Oct. 23, 2014

(65) Prior Publication Data
US 2016/0064933 A1  Mar. 3, 2016

(30) Foreign Application Priority Data
Apr. 18, 2013  (DE) .................. 10 2013 206 992

(51) Int. Cl.
*H02J 3/30* (2006.01)
*F01D 15/10* (2006.01)
(Continued)

(52) U.S. Cl.
CPC ............... *H02J 3/30* (2013.01); *F01D 15/10* (2013.01); *F02C 6/14* (2013.01); *F02C 9/00* (2013.01);
(Continued)

(58) Field of Classification Search
CPC ......... H02P 9/00; H02P 2101/25; H02K 7/18; H02K 7/1807; H02K 7/1823; Y02E 40/70;
(Continued)

(56) References Cited

U.S. PATENT DOCUMENTS 2,470,838 A * 5/1949 Stoller ................... H02K 47/04
307/64
4,158,145 A   6/1979 Kartsounes et al.
(Continued)

FOREIGN PATENT DOCUMENTS

DE  102008064060 A1  11/2009
EP  2557296 A2  2/2013
EP  2568127 A2  3/2013

OTHER PUBLICATIONS

A.L. Dyke, "Textbook for Dyke's Home Study Course of Automobile Engineering": Dyke's Instruction No. 28, 1919, A.L. Dyke, p. 70 (or p. 387 of PDF).*
(Continued)

*Primary Examiner* — Ehud Gartenberg
*Assistant Examiner* — Stephanie Cheng
(74) *Attorney, Agent, or Firm* — Beusse Wolter Sanks & Maire

(57) ABSTRACT

A method for providing negative control power for an electrical supply and/or transmission network by means of the operation of a gas turbine, includes the following steps: a dynamo-electric machine of the gas turbine is supplied with electric power for motor operation from the supply and/or transmission network; the electrical input power is regulated or controlled by the motor operation on the basis of a network signal from the supply and/or transmission network to which the gas turbine is connected; and an operating parameter of the gas turbine for motor operation is altered as a result of this regulation or control for the purpose
(Continued)

of deliberately increasing the electrical input power from the supply and/or transmission network.

12 Claims, 3 Drawing Sheets

(51) Int. Cl.
    *F02C 9/00* (2006.01)
    *H02P 101/25* (2016.01)
    *F02C 9/54* (2006.01)
    *F02C 6/14* (2006.01)

(52) U.S. Cl.
    CPC ............ *F02C 9/54* (2013.01); *F05D 2220/76* (2013.01); *F05D 2270/053* (2013.01); *H02P 2101/25* (2015.01)

(58) Field of Classification Search
    CPC .. Y02E 40/72; Y02E 40/74; H02J 3/18; H02J 3/1885; H02J 3/1892; H02J 3/24; H02J 3/28
    USPC .............................. 290/10, 31, 52, 40 B, 40 E
    See application file for complete search history.

(56) References Cited

U.S. PATENT DOCUMENTS

| | | | | |
|---|---|---|---|---|
| 5,449,568 A * | 9/1995 | Micheli | ................. | F02C 1/05 429/434 |
| 5,640,841 A * | 6/1997 | Crosby | ................. | F02C 7/264 219/121.54 |
| 6,298,653 B1 * | 10/2001 | Lawlor | ................. | F01D 1/34 60/772 |
| 6,640,548 B2 * | 11/2003 | Brushwood | ............. | F01D 17/08 60/39.463 |
| 7,566,992 B2 * | 7/2009 | Althaus | ................. | F02C 6/16 307/149 |
| 8,183,995 B2 * | 5/2012 | Wang | ................. | H02J 3/14 340/539.1 |
| 8,446,024 B2 * | 5/2013 | Rozman | ................. | H02P 27/04 290/31 |
| 2009/0277183 A1 | 11/2009 | Guzman et al. | | |
| 2011/0094236 A1 * | 4/2011 | Finkenrath | ................. | F02C 6/16 60/772 |
| 2014/0309801 A1 * | 10/2014 | Markowz | ................. | H02J 3/32 700/295 |
| 2015/0345385 A1 * | 12/2015 | Santini | ................. | F01D 15/10 290/52 |

OTHER PUBLICATIONS

AirplaneInstructor, "Starter-Generator Circuit", Mar. 2014, YouTube, https://www.youtube.com/watch?v=OG-b2uQu0ok, retrieved/viewed Apr. 4, 2018.*

Lion Hirth et al., Control Power and Variable Renewables: A Glimpse at German Data, Section 2.2. Power versus Energy, Feb. 2013, Paper submitted to the 10th International Conference on the European Energy Market, Stockholm, p. 2.*

* cited by examiner

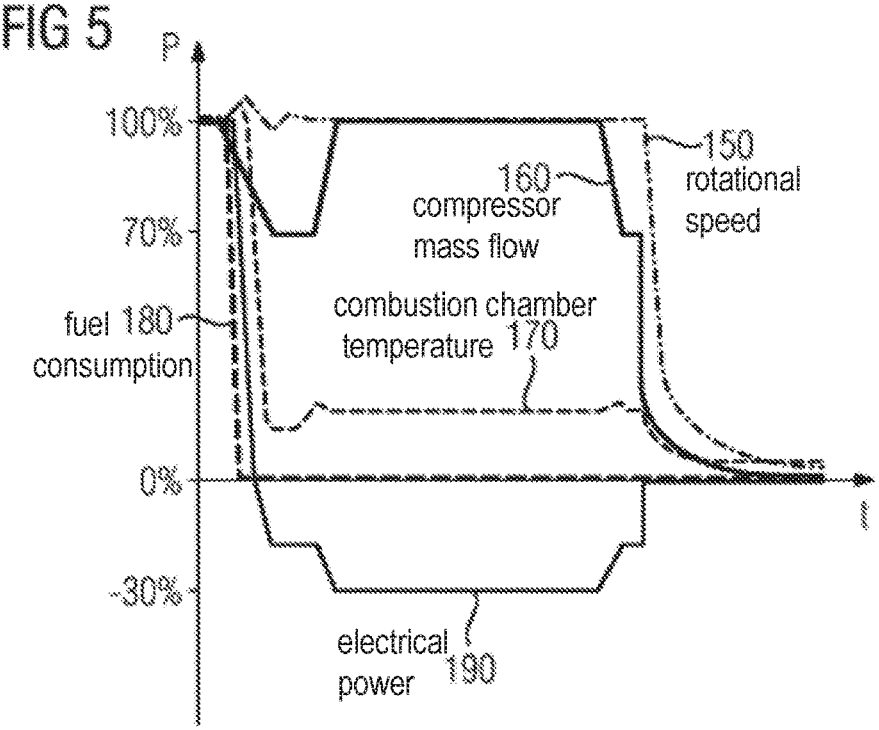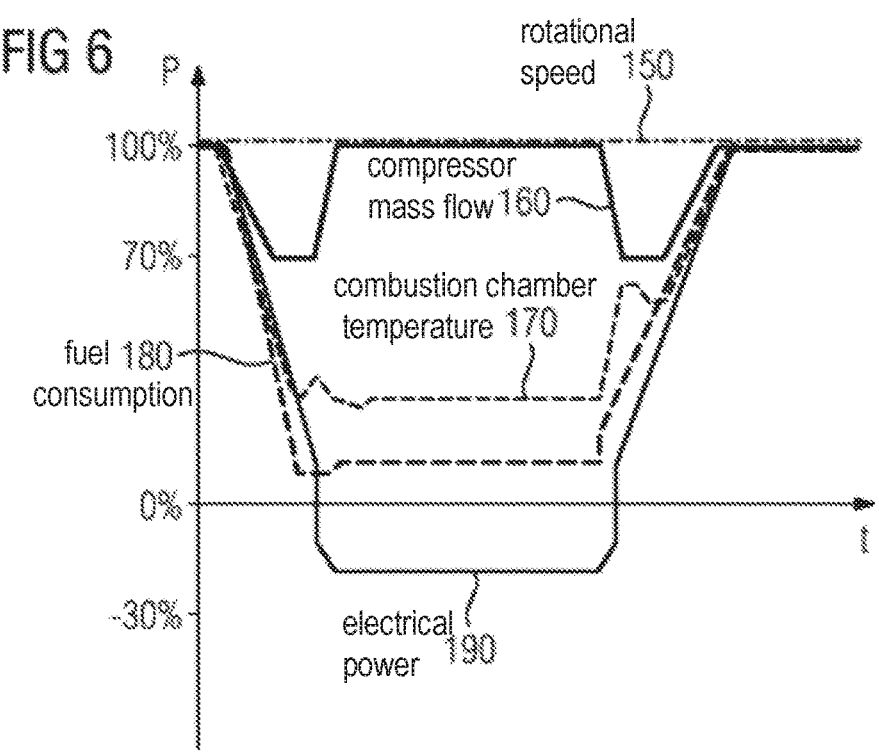

PROVISION OF NEGATIVE CONTROL POWER BY A GAS TURBINE

CROSS REFERENCE TO RELATED APPLICATIONS

This application is the U.S. National Stage of International Application No. PCT/EP2014/053828 filed Feb 27, 2014, and claims the benefit thereof. The International Application claims the benefit of German Application No. DE 102013206992.8 filed Apr. 18, 2013. All of the applications are incorporated by reference herein in their entirety.

FIELD OF INVENTION

The present invention relates to a method for providing negative control power to an electricity transmission or supply grid by the operation of a gas turbine, and to a corresponding gas turbine suitable for such a method.

BACKGROUND OF INVENTION

Owing to the increased feeding-in of electricity from renewable energy sources (solar energy, wind energy, etc), the problem of maintaining the grid stability of electricity transmission or supply grids has come into ever sharper focus in the energy industry. In order to be able to ensure stability in these grids, the electrical power fed into these grids must at all times be matched by a power consumption which is comparable with the amount fed in. This balance of supply and consumption is not always ensured in particular owing to the high fluctuations in the energy fed in from renewable energy sources. Thus, for example, fluctuations in the frequency or voltage behavior in the electricity transmission or supply grids manifest as deviations with respect to the active and reactive power ratios which also vary over time.

If an increase takes place in the electrical energy fed in from renewable energy sources, for example owing to suitable weather conditions, an excess of power may occur in the grids, similar to times when there is a low load in the grid. In order to then maintain the grid stability, this excess electrical energy needs to be removed in a suitable fashion.

Conventional approaches in the energy industry for reducing excess power in the electricity supply and/or transmission grids are based on diminishing the power output from power plants which are operating, for example fossil fuel power plants which are switched to partial load or are even operated in stand-by mode. The power supplied to the grids can be adapted to the power demand by virtue of limiting this power output.

However, it is a disadvantage of such solutions known from the prior art that it is not possible to make any direct usage of the available energy given the prevailing oversupply of electrical power. As a result, the grid is stabilized with just a certain delay. This delay may, however, sometimes last such a long time that safe and stable grid operation is not sufficiently possible.

SUMMARY OF INVENTION

A solution proposed here is intended to help to overcome these disadvantages known from the prior art. In particular, it is intended to propose a technical solution which enables a sufficiently rapid use of the electrical energy available in the transmission grids. It is intended that, when instabilities emerge in the supply and/or transmission grids, it is made possible for this usage to last for a relatively short period of time (less than one minute). Furthermore, it is intended that this electrical energy should be used on the basis of already existing energy infrastructure and controllable technology. This reduces, on the one hand, relatively large investment costs and, on the other hand, a time-consuming technological development phase. Furthermore, it is intended that the proposed technical solution also enables an operator of a power plant to make technical and hence economically viable use of the electrical energy used in this way and to output it again as electrical energy, for example in a reconversion process.

These objects on which the invention is based are achieved by a method for providing negative control power as claimed and by a gas turbine which is designed in order to carry out such a method described below.

In particular, these objects on which the invention is based are achieved by a method for providing negative control power to an electricity supply and/or transmission grid by the operation of a gas turbine comprising the following steps:—supplying electrical energy from the supply and/or transmission grid to a dynamoelectric machine of the gas turbine for operation as a motor;—controlling the electrical consumed power by operation as a motor depending on a grid signal of the supply and/or transmission grid to which the gas turbine is connected;—changing an operating parameter of the gas turbine for operation as a motor as a result of this control in order to purposefully increase the electrical consumed power from the supply and/or transmission grid.

The invention is based on the idea that, when there is an excess supply of electricity in the supply and/or transmission grids, this electricity is used by providing negative control power by the consumption of electrical reverse power by means of a dynamoelectric machine to which the gas turbine is mechanically coupled. At the same time, the transmission grid is stabilized by the use of this over-supply by electrical energy being removed from the supply and/or transmission grid.

Within the sense of the present invention, a dynamoelectric machine can take the form of both a motor and a generator. It is, however, essential that the dynamoelectric machine is suitable for operation of the gas turbine as a motor. In particular, the dynamoelectric machine takes the form of a generator which at the same time can also be operated as a motor for the operation of the gas turbine as a motor.

By virtue of operating the dynamoelectric machine as a motor, the gas turbine is furthermore operated, wherein in particular the compressor of the gas turbine furthermore compresses an air mass flow and requires compression power. This compression power is covered by the electrical energy which is removed from the supply and/or transmission grid. The thus required compression power therefore promotes the removal of electrical energy from the grids. In other words, this reverse power removed from the supply and/or transmission grids can provide a suitable negative control power in order to stabilize the grid. Because in addition the masses which need to be rotated in the gas turbine, which are kept rotating by the operation of the motor, are relatively large, a sufficient amount of electrical energy is also removed from the grids in order to enable the grid to be stabilized.

This reverse power according to the invention can be provided on the basis of pre-existing infrastructure in the energy industry. Thus, for example, pre-existing gas turbines can be operated with appropriate and cost-effective retrofitting both conventionally in order to generate electricity and according to the invention in order to provide negative control power by operating the dynamoelectric machine as a motor.

The present invention moreover proves to be advantageous because a temporary reserve can be used which can additionally contribute to stabilizing the grid, owing to the high inertia of the rotating masses in the gas turbine. In particular the high inertia of the rotating masses (rotors of the compressors and the expander) counteracts changes in the frequencies of the transmission grid in a stabilizing fashion. This action can take place essentially instantaneously.

The present invention moreover opens up the possibility of reusing for future purposes the rejected energy (corresponds to the energy converted by the operation of the dynamoelectric machine as a motor) which occurs when the negative control power from the supply and/or transmission grids is used and which does not build up in electric form but, for example, in thermal or physical form. This additional use of energy enables a use option which is advantageous in particular with respect to the efficiency and profitability of the operation of the gas turbine. In particular the energy which occurs partially as compression heat as a result of the consumed electric compression power can be used to charge a thermal energy store.

Gas turbines for providing negative control power according to the method according to the invention moreover prove to be particularly advantageous because, as explained in detail below, the thermal stress on the components which are thermally highly stressed during conventional operation to generate electricity is lower or not present at all. In this respect, for example, the equivalent operating hours (EOH) to be reported with respect to the operation of a gas turbine can not include the operating hours in reverse load mode. This therefore results in no reduction in the lifetime of the components and no reduction in maintenance intervals. This in turn ensures that the gas turbine operates in a particularly advantageous economic fashion. For example, gas turbines can be used for unfired reverse power operation with more than 100,000 operating hours without the need to take any measures to extend their lifetime or to replace thermally stressed components.

Because it is possible to switch between operating the dynamoelectric machine as a motor and conventional operation provided in order to generate electricity in a relatively short period of time (typically less than one minute and in particular less than 20 seconds), the method according to the invention can make negative control power available quickly at the first sign of grid instability. It is therefore possible to dispense with the time-consuming and sometimes insufficiently quick reduction of the power output of conventionally operating power plants. In addition, a powerful economic incentive can arise for the operator of the gas turbine in that he can offer his gas turbine, which is no longer required when there is an excess of electrical energy in the transmission grids, for energy use. This energy is sometime reimbursed by the grid operators. The gas turbine operator is thus enabled to work economically both by feeding power into the transmission grids (during conventional operation) and by making use of power when there is an over-supply of electrical energy. The switching intervals between the two operating modes can hereby be kept relatively short, for example less than one minute, in particular less than 20 seconds.

At this point it should be pointed out that a grid signal according to the invention can also be understood in the sense of a physical grid parameter which can be detected for instance technically (for example, using sensors). However, the grid signal can also be detected as a telecommunications signal which, for example, characterizes the state of the transmission grid and is output, for example, by a grid operator.

According to the present invention, the gas turbine in the sense of a gas turbine generator set has at least the functional components of the dynamoelectric machine, the compressor, the combustion chamber, and the expander. The compressor and expander can hereby be mechanically coupled to each other or also mechanically uncoupled. In the case of an uncoupled interconnection of these functional components, both the compressor and the expander can be coupled to a thermoelectric machine. In such a case the compressor is typically coupled to an electric motor and the expander to an electric generator.

According to a first embodiment of the method according to the invention, it is provided that the reverse power protection circuit of the dynamoelectric machine, which is designed in particular as a generator, is bypassed electrically or in terms of circuitry and in particular an alternative protective circuit is connected which enables the operation as a motor. Reverse power protection circuits of this type serve in particular to protect the dynamoelectric machine operated as a generator from the undesired consumption of electrical reverse power from the transmission grid. This protective function thus prevents the dynamoelectric machine designed as a generator from being used to provide electric negative control power in the sense according to the invention. In this respect, this protection circuit needs to be replaced by a suitable alternative protection circuit which enables the operation of the dynamoelectric machine as a motor in order to ensure simultaneously the controlled and safe use of electrical energy from the transmission grids.

According to a further advantageous aspect of the invention it is provided that the grid signal is the grid frequency of the transmission grid. The grid signal should be understood in this respect as a physical parameter. The grid frequency should hereby be considered as stable when a predetermined target frequency is reached. In central Europe this is 50.00 Hz. When the grid frequency deviates from this target value, in particular up to higher frequencies, it can serve as a grid signal in order to indicate the presence of a supply of excess electrical power. When a predetermined frequency threshold, for example 50.10 Hz, is exceeded, the gas turbine operator can decide to make negative control power available.

It is likewise conceivable that the grid signal is an external control signal, in particular from the operator of the transmission grid. The control signal can in particular be a telecommunications signal which is emitted by the operator of the transmission grid. When this grid signal is received, the gas turbine operator can, for example, decide to provide negative control power by virtue of reverse power operation of the gas turbine.

According to a particularly advantageous embodiment of the method according to the invention, it is provided that the changed operating parameter is the amount of fuel supplied to a combustion chamber of the gas turbine. In other words, the supply of fuel can be changed, in particular reduced, in order to obtain increased electrical reverse power consumption from the transmission grid. The maximum amount of electrical reverse power can in theory be achieved by, for example, the supply of fuel being switched off completely, wherein the electrical energy consumed during reverse power operation is provided for the mechanical operation of the gas turbine (rotation of the rotor or rotors). Moreover, in order to ensure favorable start-up behavior, this operation, however, hardly takes place and the maximum electrical reverse power which can be obtained in practice is typically reached when the supply of fuel is reduced to the amount which is still required to maintain the pilot flame operation of the gas turbine. As a result of this pilot flame operation, it can be ensured that, when necessary, the gas turbine can be powered up again quickly in order to generate electrical power. The pilot flame operation is characterized in that just the right minimum amount of fuel (pilot gas amount) is supplied to the combustion chamber of the gas turbine to prevent the combustion in the combustion chamber from being extinguished. In this respect, for economical operation of the gas turbine in reverse power mode, the amount of fuel can be reduced to this minimum amount of fuel in order to maintain the pilot flame operation. However, operation with a larger supply of fuel is, for example, also possible in supporting partial load operation. For example, the thermal energy generated by the combustion of the fuel hereby supports the operation of the gas turbine as a motor. Depending on the combustion energy generated, negative control power can hereby be made available.

According to a further advantageous embodiment of the invention, it is provided that the changed operating parameter is the mass flow sucked into the gas turbine. By changing the amount of air sucked into the compressor of the gas turbine, the compression mass flow is affected, as a result of which the compression power and hence the electrical power when the dynamoelectric machine is operating as a motor are changed. It is thus in principle conceivable to vary the mass flow sucked in by appropriate adjustment of the cross-section of the sucked-in air duct of the compressor. By enlarging this cross-section, the mass flow sucked in becomes greater, for example, as a result of which, when operating as a motor, the dynamoelectric machine can/must use greater electrical power from the grid for compression purposes.

It is moreover provided according to the embodiment that the changed operating parameter is the ratio between the fluid mass flow sucked into the compressor and that drained from the compressor. In other words, the changed operating parameter can be expressed as the change in the compression mass flow after the addition of additional compression fluid into the compressor during the compression process. Likewise, the compression power is influenced by the change in the amount of compression fluid flowing out of the compressor. Because, during the operation of the dynamoelectric machine as a motor, the compression power must be applied at least partially by the consumed electrical reverse power, the amount of consumed electrical energy can thus also be adjusted in such a way. According to a concrete embodiment, to increase the compression mass flow it is, for example, conceivable to introduce steam into the compressor in order to thus increase the performance of the compressor. Likewise, gas or compressed air could additionally be introduced, for example from a compressed air storage tank or gas storage tank into the compressor in order to further increase the required compression power.

According to a particularly advantageous embodiment of the method according to the invention, the changed operating parameter is the pitch angle of the upstream guide blades of the compressor of the gas turbine. The compression mass flow can also be affected appropriately by this change of the pitch angle of the upstream guide blades, as a result of which the compression power and hence the reverse power can be adjusted appropriately when the dynamoelectric machine operates as a motor. It should hereby be pointed out that the upstream guide blades of the compressor relate to the first compression stage of the compressor.

Alternatively or also additionally, the changed operating parameter can also be a pitch angle of downstream guide blades of the compressor of the gas turbine. The downstream guide blades differ from the upstream guide blades in that they are arranged in the second or following stage in the compressor of the gas turbine. In contrast, upstream guide blades are situated in the first stage. The compression mass flow is in turn affected by changing the pitch angle of the downstream guide blades, as a result of which the compression power can be changed. This again has effects on the quantity of reverse power which is consumed when the dynamoelectric machine operates as a motor.

According to a further particularly advantageous embodiment of the invention, the changed operating parameter is a pitch angle of the bleed valves of the compressor of the gas turbine. The compression mass flow can also be affected by changing the pitch angle of the bleed valves, by namely for example the compression resistance being increased or decreased. As a result, the compression power, which must be applied at least partially by the consumed electrical reverse power from the transmission grids when the dynamoelectric machine operates as a motor, changes again.

According to a further embodiment of the method according to the invention, it is provided that the changed operating parameter is the exhaust gas mass flow from a combustion chamber, which is supplied to an expander of the gas turbine. In other words, the performance of the whole gas turbine can be affected by changing the amount of exhaust gas which is supplied to the expander of the gas turbine from the compressor for expansion. According to the embodiment, the ratio between the exhaust gas mass flow drained from the combustion chamber and the exhaust gas mass flow fed into the expander can thus change. It is thus conceivable, for example, that the compressor and the expander of the gas turbine are, for example, mechanically uncoupled from each other. If now the exhaust gas flow is supplied from the combustion chamber not to the expander but, for example, to a different functional component (for example, a heat store), no further expansion power is generated in the expander by the gas turbine and the reverse power to be applied is primarily determined by the operation of the compressor. If, for example, the exhaust gas mass flow is, by suitable use of the thermal energy for storage purposes, for example, therefore not used to generate electrical energy, the thermal energy contained in the exhaust gas flow is not directly available for generating electricity and hence reduces the temporary overall efficiency of the gas turbine. If the thermal energy of the exhaust gas flow is temporarily stored in a heat store, for example, this thermal energy can however be used in turn at a later point in time and exploited to produce electricity, for example in a reconversion process.

According to a further advantageous embodiment of the method according to the invention, the changed operating parameter is the compression mass flow from the compressor, which is supplied to the combustion chamber of the gas turbine. In other words, the mass flow of the compression fluid supplied to the combustion chamber is changed. According to the embodiment, the ration between the fluid mass flow drained from the compressor and the fluid mass flow fed into the combustion chamber can thus change. By changing, for example, the amount of compressed air which is supplied to the combustion chamber of the gas turbine for combustion, the electricity generation performance in the whole gas turbine can in turn be affected. If, for example, the compression mass flow from the compressor is not supplied to the combustion chamber but, for example, to a different functional component (for example, a compressed air store or a heat store), it is possible that only a relatively low combustion power is achieved by the gas turbine and consequently also only a relatively low expansion power is released in the expander. Accordingly, the reverse power to be applied is primarily determined by the operation of the compressor. This in turn mainly requires the use of electrical energy in reverse power operation and does not allow any electrical energy to occur from generation in the expander. Moreover, this method according to the embodiment allows the energy which is temporarily stored, for example, in an energy store to be used later.

According to a further advantageous aspect of the invention, a further step in the method according to the embodiment is additionally included. This step is to feed rejected energy into an energy store during the operation of the dynamoelectric machine as a motor. Rejected energy can hereby occur in the sense of thermal energy which is not used directly (for example, to generate electricity in the expander), as physical energy, or as chemical energy. Such an energy store can in this respect be designed as a heat store, compressed air store and/or thermochemical store in which the rejected energy is stored in a suitable form. This temporary storage of the energy, on the one hand, results in highly flexible operation of the gas turbine in reverse power operation and, on the other hand, the energy generated during this operation can also additionally be advantageously used again economically in other forms at a later point in time.

The invention is to be explained in detail below with the aid of individual drawings. It should be pointed out hereby that the drawings should be understood only schematically and do not represent any limitation with respect to the practicability of the invention.

The individual features shown in the following drawings are claimed independently as well as in any combination with other features, as long as this combination is capable of solving the objects of the present invention.

It should furthermore be pointed out that the technical features which are labeled with the same reference numerals have a comparable technical effect.

BRIEF DESCRIPTION OF THE DRAWINGS

In the drawings:

FIG. 5 shows a diagrammatic view of the progression over time of different technical characteristics during the operation of a gas turbine according to an embodiment of the method according to the invention when the supply of fuel is switched off;

FIG. 6 shows a diagrammatic view of the progression over time of different technical characteristics during the operation of a gas turbine according to an embodiment of the method according to the invention when the supply of fuel to the gas turbine is reduced to the supply with a minimal amount of fuel in order to maintain pilot flame operation.

DETAILED DESCRIPTION OF INVENTION

Figure 1:
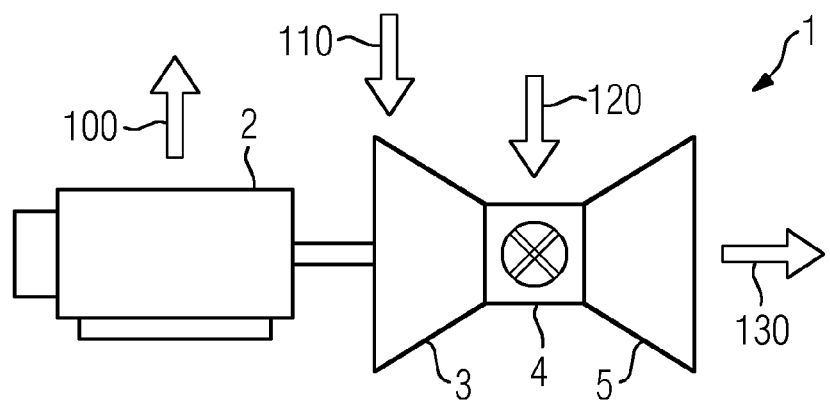
FIG. 1 shows a schematic diagram with energy flows during conventional operation of a gas turbine for generating electrical power which can be made available to a supply or transmission grid.

FIG. 1 shows schematically an embodiment of a gas turbine 1 which is conventionally operated in order to generate electricity. The gas turbine 1 comprises, in the sense of a gas turbine generator set, a dynamoelectric machine 2 working as a generator, a compressor 3, a combustion chamber 4 and an expander 5. The dynamoelectric machine 2 is hereby mechanically coupled to the compressor 3 and/or to the expander 5 by a shaft (not provided with a reference numeral). During conventional operation of the gas turbine 1, sucked-in air 110 is supplied to the compressor 3 and is combusted in the combustion chamber 4 together with fuel 120. The exhaust gas from this combustion is expanded by the expander 5 in order to provide mechanical power. A rotational movement is imparted to the shaft by this expansion process, wherein the dynamoelectric machine 2 is simultaneously energized and electrical energy 110 can be generated and output. Thus electrical energy 100 is typically transmitted to supply and/or transmission grids as electrical energy (not shown in the present case). The expanded exhaust gas 130 is discharged from the expander 5 and can be supplied to other functional components (not shown in the present case) for further possibly thermal use.

Figure 2:
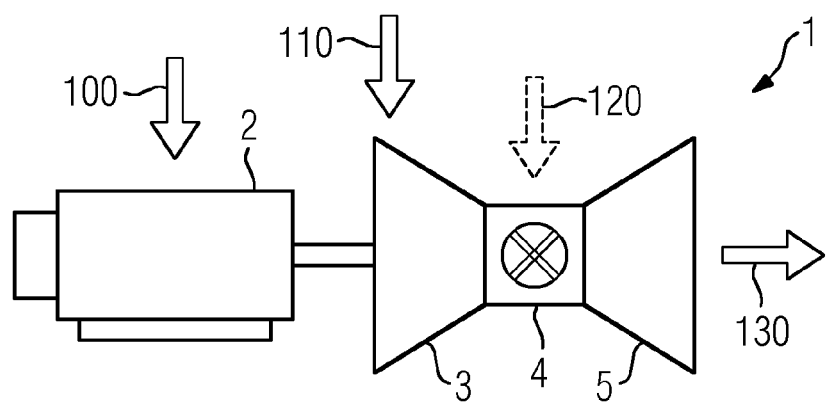
FIG. 2 shows a schematic view of a gas turbine, which is operated in reverse power operation in order to provide negative control power, with the energy flows which are also shown, wherein the electrical reverse power is taken from a supply or transmission grid.

FIG. 2 now shows a further schematic view of the gas turbine 1 shown in FIG. 1, wherein the operating state is not the conventional one of generating electricity but the one according to an embodiment of the method according to the invention for using electrical energy by means of reverse power operation. For this reverse power operation, the dynamoelectric machine 2, which then operates in the sense of a motor, consumes electrical energy 100 from a supply and/or transmission grid and converts it into a rotational movement of the shaft (not provided further with a reference numeral). This results in turn in a rotational movement of the rotor of the compressor 3 so that sucked-in air 110 flows into the compressor 3 and is compressed. This air compressed in this way is supplied to the combustion chamber 4 in which it can optionally be at least partially combusted with fuel 120. The amount of fuel supplied into the combustion chamber 4 can be adjusted according to the negative control power demanded. After corresponding (partial) combustion, or if no such combustion takes place, after compression and throughflow have taken place in the combustion chamber 4, the exhaust gas 130 (=combustion exhaust gas or compressed air or a mixture of the two) is expanded by the expander 5.

The pressure energy or the thermal energy of the amount of energy still remaining in the exhaust gas 130 can, for example, hereby be reused. In other words, the gas turbine 1 can be operated up to 60% of the electrical target power for providing negative control power, for example by operating the dynamoelectric machine 2 as a motor. This control power can be provided in a relatively short period of time. The fuel supply of the fuel 120 can thus, for example, be reduced. This process can be supported, for example, by a further change in the pitch angle of the guide blades or by opening the bleed valves of the compressor. These adjustments are made according to the desired power gradient.

In principle, the possibility exists of completely interrupting the supply of fuel and hence for very high power consumption by the gas turbine 1. Alternatively, different partial amounts of power can, however, be obtained, for example by a combination of a reduction in the compression mass flow, a change in the pitch angle of the guide blades, and a reduction in the fuel mass flow, for example up to the minimum amount of fuel which still permits operation in pilot flame mode.

Figure 3:
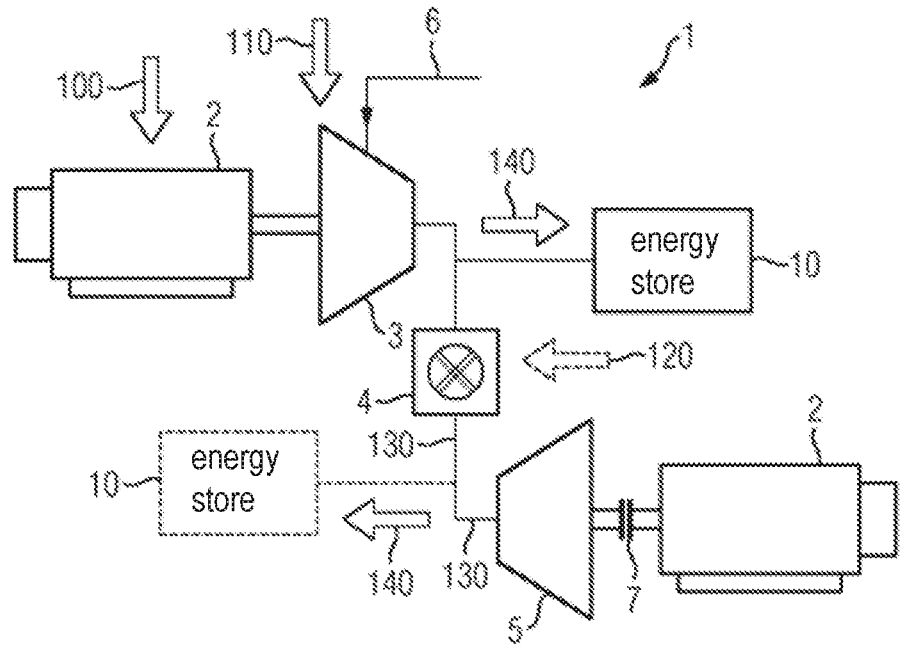
FIG. 3 shows an embodiment of the gas turbine according to the invention in a schematic diagram for performing an embodiment of the method according to the invention for providing negative control power.

FIG. 3 shows a further embodiment of the gas turbine 1 according to the invention which has a compressor 3 and an expander 5 which are mechanically uncoupled from each other. The two of them are connected to the combustion chamber 4 by a suitable line (not provided with a reference numeral). At the same time, the compressor 3 is coupled, via a shaft (not provided with a reference numeral) to a dynamoelectric machine 2 which according to an embodiment is designed in order to consume electrical energy 100 from a supply and/or transmission grid. The air 110, sucked in by the operation of the dynamoelectric machine 2 as a motor and compressed in the compressor 3, is supplied to the combustion chamber 4 in which it can be combusted, for example together with fuel 120. In order to increase the compression mass flow, it can be provided that water can be provided, in the form of steam, to the compressor 3 via a fluid supply line 6. Alternatively, a gas can also be supplied to the compression space via this fluid supply line 6 which is removed, for example, from a gas store in order to increase the compression mass flow.

Part or all of the compression mass flow drained from the compressor 3 can be supplied to an energy store 10 in order to store physical and/or chemical energy. This energy store can be designed, for example, as a pressure store or heat store. If part of the compression mass flow is combusted in the combustion chamber 4 with fuel 120, this exhaust gas 130 can be supplied to the expander 5 for expansion. Alternatively or also additionally, this exhaust gas 130 can also be supplied to a further energy store 10 in order to store physical and/or chemical energy 140. This energy store 10 can also be designed, for example, as a pressure store or heat store.

When the exhaust gas 130 is expanded via the expander 5, according to the embodiment the dynamoelectric machine 2, which is coupled to the expander 5 via a shaft (not provided with a reference numeral), can be energized. If the dynamoelectric machine 2 and the expander 5 are connected to each other via a coupled shaft, the exhaust gas 130 can also be expanded for example via the expander 5 without the dynamoelectric machine being energized. In this case only gas expansion with simultaneous cooling of the exhaust gas 130 takes place.

Figure 4:
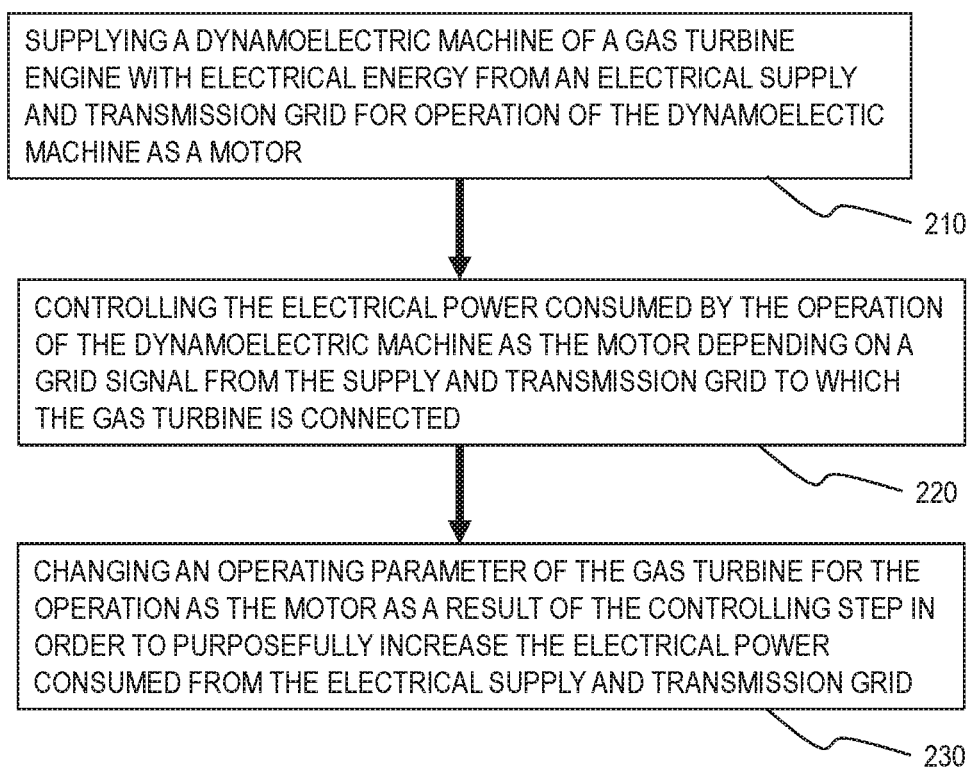
FIG. 4 shows a flow diagram of an embodiment of the method according to the invention for providing negative control power.

FIG. 4 shows a further embodiment of the method according to the invention for providing negative control power in a flow diagram view. The method hereby has the following steps: —supplying a dynamoelectric machine 2 of the gas turbine 1 with electrical energy from an electrical supply and/or transmission grid for operation as a motor (first method step 210); —controlling the electrical consumed power by the operation as a motor depending on a grid signal from the supply and/or transmission grid to which the gas turbine 1 is connected (second method step 220); —changing an operating parameter of the gas turbine 1 for the operation as a motor as a result of this control in order to purposefully increase the electrical consumed power from the transmission grid (third method step 230).

FIG. 5 shows a diagrammatic view of the dependence over time of different technical operating parameters during the operation according to an embodiment of a gas turbine 1 for providing negative control power to a supply and/or transmission grid. It is hereby shown how the different operating parameters are changed after changing conventional electricity-generating operation of the gas turbine 1 in order to perform the method according to the embodiment for providing negative control power. The changes were predicted on the basis of simplified modeling. The rates of change are given only relative to the magnitudes which are present during conventional operation for generating electricity.

It should, for example, be noted that the supply of fuel 120 is completely switched off. The consumption of fuel 180 consequently drops to a level of 0%. At the same time, the dynamoelectric machine 2 consumes electrical energy from the grid and ensures, after an initial short integration phase, a rotational speed 150 which is maintained essentially constant. During the integration phase, the compressor mass flow 160 decreases for a short period of time but, when a target rotational speed is reached, it rises again to 100% of its original value. Because the combustion in the combustion chamber 4 is completely stopped, the combustion chamber temperature, which is adjusted to a slightly increased level above 0% (=no temperature increase above a surrounding temperature level), also falls. The increase in temperature is derived substantially from the compression heat released during the compression of the sucked-in air 110.

As the diagrammatic view illustrates, in an easily comprehensible fashion, the electrical exhaust power 190 of the gas turbine 1 also falls from a positive value of 100% to a negative value of −30%. The gas turbine 1 consequently has to consume negative control power in order to be able to maintain its operation. This electrical power consumed in this way is used to provide negative control power to a supply and/or transmission grid.

The diagram moreover shows, toward the end of the time frame, a new sudden change in the operating parameter as a result of the gas turbine 1 being completely switched off (uncoupling from the grid).

FIG. 6 shows a further diagrammatic view of the change over time of different technical operating parameters during operation of a gas turbine 1 according to an embodiment of the method according to the invention in order to provide negative control power. In a fashion similar to the operation illustrated in FIG. 5, the supply of fuel 120 to the combustion chamber 104 of a gas turbine 1 is hereby reduced. In contrast to the method shown in FIG. 5, however, the supply of fuel is not suppressed to the extent that no fuel consumption 180 takes place and instead minimal fuel consumption 180 is set which is sufficient to maintain pilot flame operation of the gas turbine 1. Consequently, a higher combustion chamber temperature 170 than is the case in FIG. 5 results after a period of time during the stabilized operation. The amount of electrical power 190 consumed by the dynamoelectric machine 2 in reverse power operation is also comparatively low since the operation of the gas turbine 1 is moreover supported by the combustion of the fuel.

Toward the end of the progression over time of the changes in the technical operating parameter shown in FIG. 6, the normal electricity-generating operation is resumed by the gas turbine 1.

Other embodiments can be found in the subclaims.

The invention claimed is:

1. A method for providing negative control power to an electrical supply and transmission grid by the operation of a gas turbine, comprising:

operating a dynamoelectric machine mechanically coupled to a shaft of the gas turbine as a generator to produce electrical power and supply the electrical power to the electrical supply and transmission grid;

switching the operation of the dynamoelectric machine to a motor to consume electrical power from the electrical supply and transmission grid, based on an excess supply of electrical power in the electrical supply and transmission grid;

controlling the switching operation of the dynamoelectric machine from the generator to the motor depending on a grid signal indicating the excess supply of electrical power from the supply and transmission grid to which the gas turbine is connected resulting from a frequency deviating higher than a target value;

wherein an amount of the electrical power consumed is controlled by changing an operating parameter of the gas turbine which includes at least adjusting an amount of fuel fed to a combustion chamber of the gas turbine when operating the dynamoelectric machine as the motor to purposefully increase the amount of the electrical power consumed from the electrical supply and transmission grid and remove at least a portion of the excess supply of electrical power in the electrical supply and transmission grid, wherein the amount of fuel fed to the combustion chamber is adjusted according to the negative control power needed to maintain grid stability;

wherein the amount of the electrical power consumed from the electrical supply and transmission grid that is converted into rotational movement of the shaft of the gas turbine is sufficient to maintain a rotational speed of the shaft of the gas turbine essentially constant in view of the adjustment in the amount of fuel, and wherein a compressor of the gas turbine remains fluidly and mechanically coupled to an expander of the gas turbine during both operation of the dynamoelectric machine as the motor and as the generator such that when the shaft is rotating, the compressor and the expander are rotating and fluid flow is maintained through both the compressor and the expander.

2. The method as claimed in claim 1, further comprising bypassing a reverse power protection circuit of the dynamoelectric machine electrically or in terms of circuitry when operating the dynamoelectric machine as the motor.

3. The method as claimed in claim 2, wherein the dynamoelectric machine is designed as a generator and wherein a reverse power protection circuit of the dynamoelectric machine is bypassed electrically or in terms of circuitry and an alternative protective circuit is connected which enables operation of the dynamoelectric machine as the motor.

4. The method as claimed in claim 1, wherein the grid signal is an external control signal, from an operator of the electrical supply and transmission grid indicating the excess supply of electrical power from the supply and transmission grid.

5. The method as claimed in claim 1, wherein the changed operating parameter further comprises a sucked-in mass flow of the gas turbine.

6. The method as claimed in claim 1, wherein the changed operating parameter further comprises a pitch angle of upstream guide blades of the compressor of the gas turbine.

7. The method as claimed in claim 1, wherein the changed operating parameter further comprises a pitch angle of downstream guide blades of the compressor of the gas turbine.

8. The method as claimed in claim 1, wherein the changed operating parameter further comprises a pitch angle of bleed valves of the compressor of the gas turbine.

9. The gas turbine adapted to carry out the method as claimed in claim 1.

10. The method as claimed in claim 1, wherein the changed operating parameter further comprises at least one of:
   a sucked-in mass flow of the gas turbine;
   a pitch angle of upstream guide blades of the compressor of the gas turbine;
   a pitch angle of downstream guide blades of the compressor of the gas turbine; and
   a pitch angle of bleed valves of the compressor of the gas turbine.

11. The method as claimed in claim 1, further comprising when operating the dynamoelectric machine as the motor at least one of:
   completely interrupting the amount of fuel supplied to the combustion chamber of the gas turbine; and
   reducing the amount of fuel supplied to the combustion chamber of the gas turbine to an amount that is not less than a minimal fuel amount to maintain pilot flame operation of the gas turbine.

12. The method as claimed in claim 1, wherein the grid signal is one of:
   a grid frequency indicating an excess supply of electrical power in the electrical supply and transmission grid, and
   an external control signal, from an operator indicating an excess supply of electrical power in the electrical supply and transmission grid.

* * * * *